US008616086B2

(12) United States Patent
Hirai et al.

(10) Patent No.: US 8,616,086 B2
(45) Date of Patent: Dec. 31, 2013

(54) HARMONIC SPEED REDUCER FOR ROBOTS

(75) Inventors: Yoshitaka Hirai, Kariya (JP); Masatoshi Kojima, Nukata-gun (JP)

(73) Assignee: Denso Wave Incorporated, Tokyo (JP)

( * ) Notice: Subject to any disclaimer, the term of this patent is extended or adjusted under 35 U.S.C. 154(b) by 334 days.

(21) Appl. No.: 12/780,136

(22) Filed: May 14, 2010

(65) Prior Publication Data
US 2010/0288066 A1    Nov. 18, 2010

(30) Foreign Application Priority Data
May 15, 2009   (JP) .................................. 2009-118682

(51) Int. Cl.
*F16H 35/00* (2006.01)
(52) U.S. Cl.
USPC .............................................. 74/640; 901/25
(58) Field of Classification Search
USPC ............................ 74/640, 416; 29/893, 893.1
See application file for complete search history.

(56) References Cited

U.S. PATENT DOCUMENTS

| 2,167,558 | A | * | 7/1939 | Upson | 411/411 |
| 2,167,559 | A | * | 7/1939 | Upson | 411/415 |
| 3,094,190 | A | * | 6/1963 | Hulsing et al. | 184/6.9 |
| 3,590,671 | A | * | 7/1971 | Wahli | 408/199 |
| 4,683,844 | A | * | 8/1987 | Arai et al. | 123/41.74 |
| 4,784,014 | A | * | 11/1988 | Bruns et al. | 74/640 |
| 4,840,090 | A | * | 6/1989 | Iwata | 74/640 |
| 5,678,962 | A | * | 10/1997 | Hyatt et al. | 409/66 |
| 6,564,677 | B1 | * | 5/2003 | Kiyosawa et al. | 74/640 |
| 7,698,968 | B2 | * | 4/2010 | Kobayashi | 74/640 |
| 2003/0138302 | A1 | * | 7/2003 | Newmark | 408/119 |
| 2005/0210651 | A1 | * | 9/2005 | Vrana et al. | 29/432.1 |
| 2005/0226702 | A1 | * | 10/2005 | Ladouceur | 411/427 |
| 2007/0204723 | A1 | * | 9/2007 | Saito | 74/640 |

FOREIGN PATENT DOCUMENTS

| JP | A-9-250607 | 9/1997 |
| JP | A-9-303498 | 11/1997 |
| JP | A-11-264448 | 9/1999 |
| JP | A-2006-002828 | 1/2006 |

OTHER PUBLICATIONS

LaRoux K. Gillespie—Hand Deburring: Increasing Shop Productivity, 2003 Society of Manufacturing Engineers—pp. 56, 59, 63. 60, 63.*

Jan. 8, 2013 Office Action issued in Japanese Patent Application No. 2009-118682 (with translation).

* cited by examiner

*Primary Examiner* — Troy Chambers
*Assistant Examiner* — Valentin Craciun
(74) *Attorney, Agent, or Firm* — Oliff & Berridge, PLC

(57) ABSTRACT

A harmonic speed reducer for robots is provided with a frame, an annular circular spline, a cylindrical flexspline, and an elliptical wave generator. The frame has internal threads each tapped parallel to the center axis line, the threads each extending from a circular spline mounting seat to the inside of the frame. The internal thread in the circular spline mounting seat has a peripheral edge portion at an opening thereof with a recess. The recess is formed so as to have a diameter larger than a diameter of the internal thread.

1 Claim, 12 Drawing Sheets

PROCEDURE OF FORMING INTERNAL THREAD IN CONVENTIONAL ART a1 | MACHINE COARSE CAST MEMBER TO FORM CIRCULAR SPLINE MOUNTING SEAT
a2 | DRILL PILOT HOLE FOR INTERNAL THREAD
a3 | TAP INTERNAL THREAD IN CIRCULAR SPLINE MOUNTING SEAT

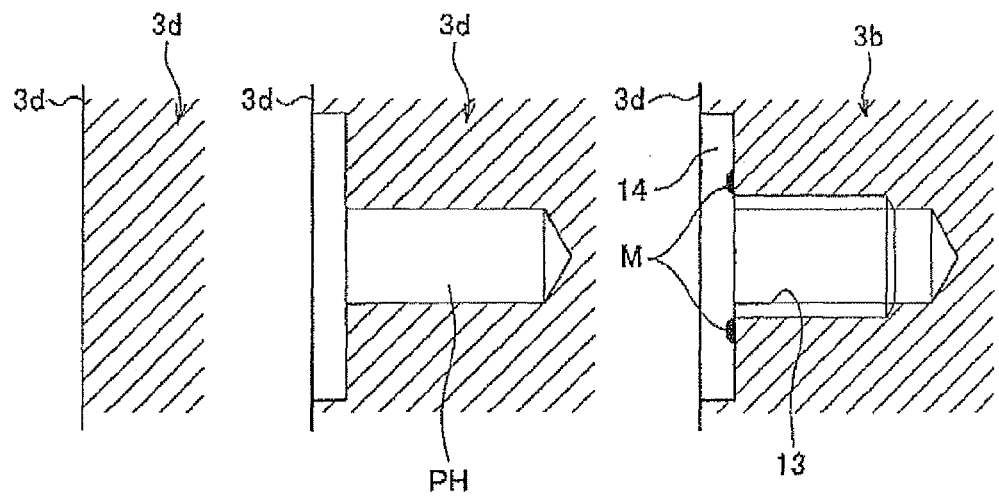

|  | FLATNESS (ROUGHNESS DIFFERENCE [mm]) | | |
| --- | --- | --- | --- |
|  | SCRAPED | CONVENTIONAL ART | RECESSED |
| AXIS J2 | 0.0027 *3 | 0.0100 *1 | 0.0019 *5 |
| AXIS J3 | 0.0025 *4 | 0.0083 *2 | 0.0017 *6 |

FIG.14A Prior Art
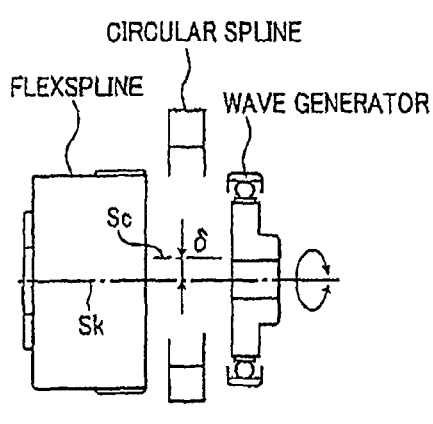
FIG.14B Prior Art
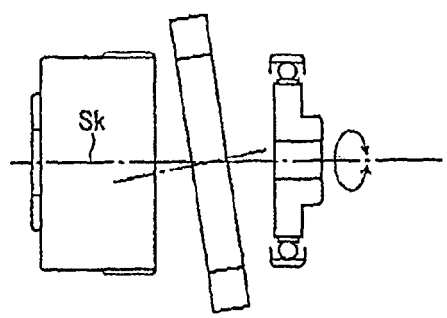
FIG.14C Prior Art
FIG.14D Prior Art
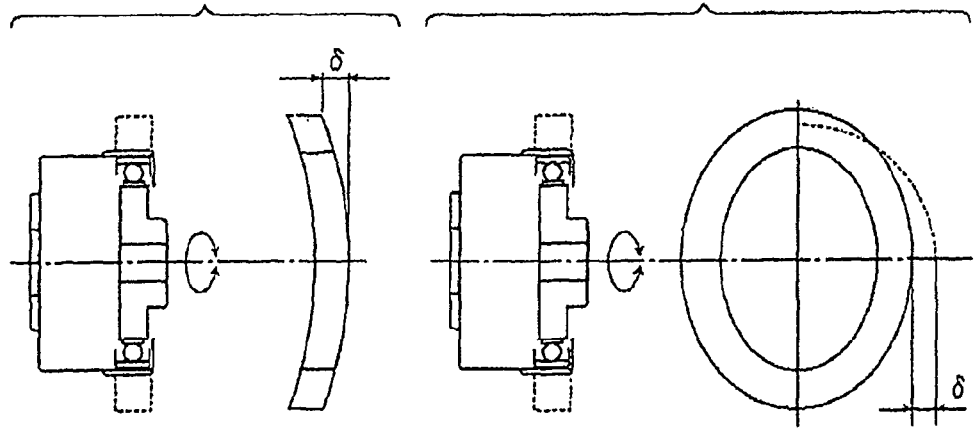

HARMONIC SPEED REDUCER FOR ROBOTS

CROSS-REFERENCE TO RELATED APPLICATION

This application is based on and claims the benefit of priority from earlier Japanese Patent Application No. 2009-118682 filed May 15, 2009 the descriptions of which are incorporated herein by reference.

BACKGROUND OF THE INVENTION

1. Technical Field of the Invention

The present invention relates to a harmonic speed reducer for robots, which is used for a joint or other members of robots including robots used in factories.

2. Related Art

It has been known that multijoint robots, for example, have a configuration in which a harmonic speed reducer is used in actuating and rotating each joint by a motor. The harmonic speed reducer is based on a harmonic Drive® technique. Such a harmonic speed reducer has an advantage of having a large speed reducing ratio and thus is very useful as a speed reducer for robots.

FIG. 1 shows an example of a configuration of a harmonic speed reducer in a robot. A harmonic speed reducer 81 includes as main components a housing 82, a frame 83, a circular spline (internal tooth gear) 84, a flexspline (external tooth gear) 85, and a wave generator 86. The frame 83, which is hollow, is formed in the housing 82 of a robot arm. The circular spline 84 having an annular shape is provided with inner teeth at its inner periphery and fixed to the frame 83. The flexspline 85 having a cylindrical shape is provided with outer teeth at its outer periphery for engagement with the inner teeth of the circular spline 84. The wave generator 86 having an elliptical shape is fitted to the flexspline 85 along its inner periphery.

The wave generator 86 is connected to a rotary shaft, i.e. an input shaft, of a servomotor 87. The flexspline 85 is connected to an inner race 88a, i.e. an output shaft, of a cross roller bearing 88. The inner race 88a, or the output shaft, of the cross roller bearing 88 is connected to an arm or the like.

The circular spline 84 is mounted on a circular spline mounting seat 83a of the frame 83 with the aid of a circular spline holder 89 (hereinafter also just referred to as "holder 89") and screws 90. In this regard, the seat 83a is formed with internal threads 91, while the circular spline 84 is formed with screw insertion holes 92 corresponding to the internal threads 91. The holder 89 as well is formed with screw la insertion holes 93 corresponding to the internal threads 91. The screws 90 are inserted into the respective insertion holes 93 of the holder 89 and the respective insertion holes 92 of the circular spline 84 for threadable engagement with the respective internal threads 91. The circular spline 84 is mounted on the seat 83a in this way.

FIG. 2 shows a procedure of forming the seat 83a and each internal thread 91. As shown in FIG. 2, a circular spline mounting seat is formed by machining in a coarse cast member that constitutes a robot housing (step a1). Then, a pilot hole for internal thread is drilled (step a2). Finally, the pilot hole is tapped to form an internal thread (step a3).

Recently, robots are requested to have a higher degree of repeat accuracy (how many times the same trajectory can be repeatedly drawn). The repeat accuracy tends to be adversely affected by vibration having irregularly changing intensity. The cause of vibration in a robot is ascribed to the vibration of harmonic speed reducers used in the robot. Therefore, it is necessary to mitigate the vibration of each of the harmonic speed reducers in order to achieve a high degree of repeat accuracy of the robot.

For example, a patent document JP-A-H11-264448 discloses a method of mitigating vibration of a harmonic speed reducer used for robots. According to this patent document, errors caused by vibration are measured for each robot. Then, an error value calculated from the measurement is incorporated in the control of the robot as a correction value. As a result, a control error that would have been caused by the vibration is ensured to be eliminated for the improvement of the repeat accuracy.

When the method of the conventional art mentioned above is used in mass production, the method necessitates such processes as measurement of vibrations of each robot, calculation of an error value based on the measured vibrations, and preparation of the error value as a correction value. It is true that the repeat accuracy can be improved through these processes but the production efficiency will be extremely lowered. Therefore, these processes are not suitable for mass production. A different approach may be to apply error value of a certain robot to all of other robots in order to raise the production efficiency. This however will not lead to the improvement of the repeat is accuracy, because the errors caused by vibration depend on each specific robot.

SUMMARY OF THE INVENTION

The present invention has been made in light of the circumstances set forth above and has as its object to provide a harmonic speed reducer for robots, which is able to improve repeat accuracy and can be applied to mass production as well.

The inventors of the present invention studied whether any structural improvement can be made in a harmonic speed reducer incorporated in a robot in order to mitigate vibration of the harmonic speed reducer. First of all, the inventors examined the influence on vibration amplitude given by the mounting error of each of the components, i.e. a circular spline, a flexspline and a wave generator, of a harmonic speed reducer.

In conducting the examination, reference was made to the patent document JP-A-H11-264448. The patent document JP-A-H11-264448 exemplifies, as patterns of mounting error, the cases where: a geometric accuracy axis Sc is decentered (offset) from a basic axis Sk as shown in later-described FIG. 14A (the amount of decentering is indicated by a symbol δ); the circular spline is inclined with respect to the basic axis Sk as shown in FIG. 14B; the circular spline is deformed in the axial direction as shown in FIG. 14C; and the circular spline is deformed in the radial direction as shown in FIG. 14D The patent document JP-A-H11-264448 describes that the vibration amplitude is large in the cases of FIGS. 14C and 14D. It is expected that reduction of the mounting error in either of the cases of FIGS. 14C and 14D may lead to the mitigation of the entire vibration of the harmonic speed reducer. Since the mounting error in the radial direction of the circular spline shown in FIG. 14D is extremely small, structural improvement is difficult under existing conditions.

Considering that the case of FIG. 14C leaves room for improvement, the inventors studied what mounting errors would deform a circular spline in the axial direction.

First, an assumption was made that the cause of the axial deformation of a circular spline resided in the micro-roughness in the surface of a circular spline mounting seat.

The degree of the micro-roughness depends on the processing of the seat. Flattening of such a circular spline mounting seat in the conventional art has been finished performed only machining. Considering this, the inventors of the present invention attempted to raise the degree of flatness by performing scraping in addition to the machining. FIG. 15, which will be later described, is a time diagram illustrating a procedure of forming an internal thread and of performing scraping. As shown in FIG. 15, a coarse cast member is machined to form a circular spline mounting seat (step b1). Then, a pilot hole for internal thread is drilled in the seat (step b2). Then, the pilot hole is tapped to form an internal thread (step b3). Finally, the seat is subjected to scraping (step b4).

Scraping is a process which is performed by hand. In performing scraping, red lead is thinly applied to a platen as a reference plane to frictionally rub the red lead against a surface to be processed. As a result, only the high-level portions of the surface to be processed are colored red by the red lead. The process is finished by trimming down the red-colored high-level portions using a scraping tool. After performing this scraping process, the surface will have a higher degree of flatness. In this way, an extremely high level of skill is required in performing scraping.

As a result of using scraping in finishing the procedure, the obtained circular spline mounting seat could exert good suppression of the axial deformation of the circular spline, and thus could mitigate vibration.

As mentioned above, however, scraping requires an extremely high level of skill. Moreover, as will be understood from the comparison between FIGS. 2 and 15, scraping raises a problem of increasing the number of processing steps and thus is not suitable for mass production.

The inventors of the present invention found during the scraping process that some portions were colored red and some portions were not colored red in the peripheral edge of the opening of each of the plurality of internal threads in the circular spline mounting seat. It was also found that no portions were colored red in other areas. In other words, it was found that the level of uplift was high in some portions and the level of uplift was low in some portions in the peripheral edge of the opening of each of the plurality of internal threads.

The "uplift" mentioned above is a so-called "tapping uplift" (indicated by M in FIG. 3) which is secondarily formed in tapping an internal thread. The tapping uplift is assumed to be the cause of the axial deformation of the circular spline when it is mounted on a frame.

Study on the tapping uplift M made by the inventors resulted that the level of the tapping uplift M was varied in some cases and not varied in some cases. In the former cases, the axial deformation occurred in the circular spline when it was mounted on a frame. In the latter cases, the occurrences of the axial deformation were less than the former cases.

However, productivity will be lowered if the variation in the level of tapping uplift M is examined every time a circular spline is mounted, and if the scraping process is performed every time variation is found as a result of the examination. Therefore, this scheme is not suitable for mass production.

The inventors made an attempt to primarily eliminate the tapping uplift of all of the internal threads in a circular spline mounting seat based on the studies and examinations set forth above, without performing scraping. Specifically, the inventors of the present invention formed a recess around the peripheral edge portion of the opening of each internal thread in a circular spline mounting seat, the recess having a diameter larger than that of the internal thread, followed by mounting a circular spline on the seat. Vibration examination conducted then resulted that vibration was mitigated to substantially the same level as in the case where scraping was performed. In this way, the circular spline could be mounted on the seat without performing scraping and without causing axial deformation.

The present invention was made as a result of the studies set forth above. Thus, there is provided a harmonic speed reducer for robots comprising a frame formed in a housing; an annular circular spline fixed to the frame and having an inner periphery provided with inner teeth; a cylindrical flexspline inserted into the circular spline and having an outer periphery provided with outer teeth that are in engagement with the inner teeth, the flexspline being connected with an output shaft; an elliptical wave generator fitted into the flexspline and connected with an input shaft; and a circular spline mounting screw. In this configuration, the frame has a through hole with its one open end having a peripheral edge portion provided with a circular spline mounting seat of which surface is planar in a direction perpendicular to a center axis line that is an extension of a center line of the output shaft of the harmonic speed reducer; the frame has an internal thread tapped parallel to the center axis line, the thread extending from the circular spline mounting seat to the inside of the frame, the internal thread in the circular spline mounting seat having a peripheral edge portion at an opening for the internal thread, the peripheral edge portion being formed with a recess having a diameter larger than a diameter of the internal thread; the circular spline has a screw insertion hole at a position corresponding to the internal thread, the screw insertion hole being formed from one end face to the other end face of the circular spline so as to be parallel to the center axis line; and the circular spline mounting screw is passed through the screw insertion hole of the circular spline and the recess, and threaded into the internal thread, for fixation of the circular spline onto the frame.

According to the harmonic speed reducer for robots having the above configuration, the circular spline mounting seat is provided with the recesses. Each of the recesses is provided around the peripheral edge portion of the opening of each internal thread formed in the seat, the diameter of each recess being larger than that of each internal thread. Formation of such recesses can eliminate the so-called tapping uplift in the peripheral edge portion of the opening of each of the internal threads. Under these conditions, the circular spline mounting screws are passed through the respective screw insertion holes of the circular spline holder, the respective screw insertion holes of the circular spline and the respective recesses, and threaded into the respective internal threads of the frame, for fixation of the circular spline onto the frame. In fixing the circular spline to the frame, no axial deformation is caused in the circular spline. In this way, with only the simple configuration of forming the recesses, the harmonic speed reducer can mitigate vibration to thereby enhance the repeat accuracy of the robot. In addition, the simple configuration is suitable for mass production.

In the foregoing configuration, in stead of the recess of the circular spline mounting seat, the screw insertion hole being formed with a recess therearound so as to be coaxial with an opening for the internal thread and to have a diameter larger than a diameter of the internal thread.

According to the harmonic speed reducer for robots having the above configuration, the tapping uplift, if any, in the peripheral edge portion of the opening of each of the internal threads formed in the circular spline mounting seat of the frame, can be accommodated in the corresponding recess formed in the circular spline when the circular spline is fixed to the frame. As a result, in this configuration as well, the circular spline can be mounted on the frame without causing axial deformation. In this way, with only the simple configuration of forming the recesses, the harmonic speed reducer can mitigate vibration to thereby enhance the repeat accuracy of the robot. In addition, the simple configuration is suitable for mass production.

BRIEF DESCRIPTION OF THE DRAWINGS

In the accompanying drawings;

FIGS. 7A to 7C are cross-sectional views illustrating the production of an internal thread and a recess associated with the harmonic speed reducer;

FIG. 8 is a time diagram illustrating a procedure of processing the recess and the internal thread;

FIGS. 14A to 14D each illustrate a state of a circular spline having different mounting error;

DETAILED DESCRIPTION OF THE PREFERRED EMBODIMENTS

With reference to the accompanying drawings, hereinafter will be described a few embodiments of the present invention.

First Embodiment

Figure 4:
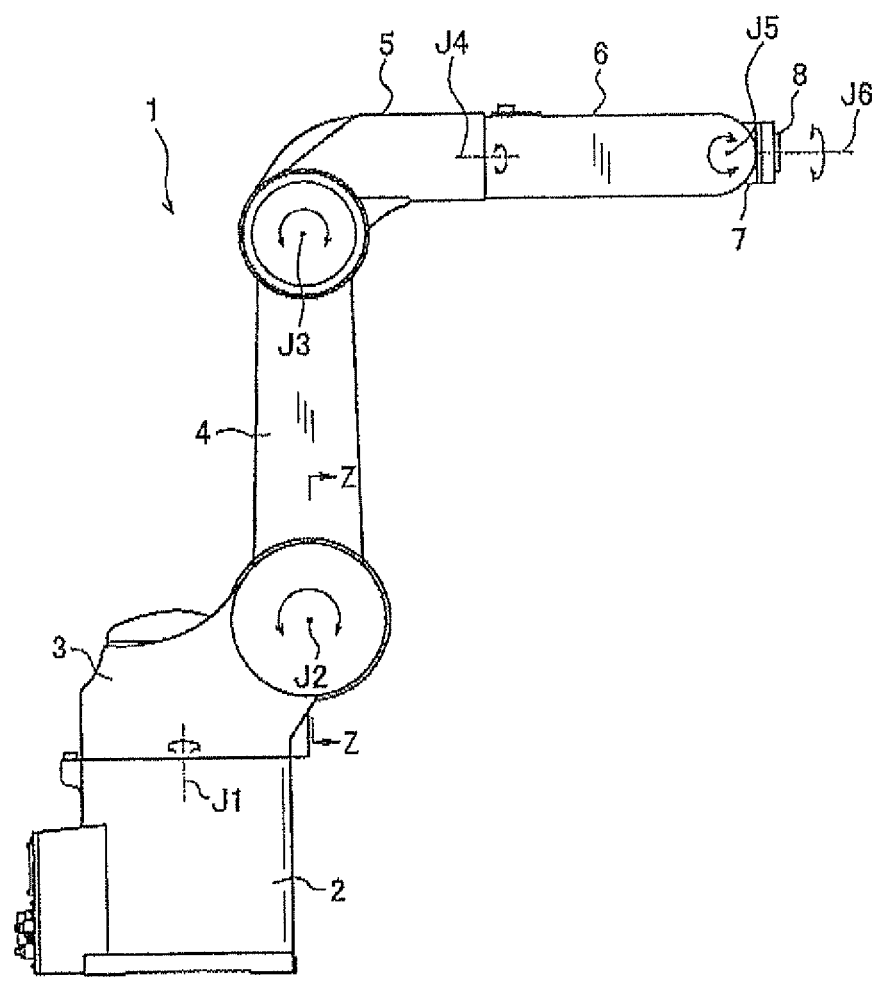
FIG. 4 is a side view illustrating a robot in general that uses the harmonic speed reducer according to a first embodiment of the present invention.

Referring first to FIGS. 4 to 13, a first embodiment of the present invention is described. FIG. 4 illustrates an appearance configuration of a multijoint robot 1 that uses harmonic speed reducers. In FIG. 4, the multijoint robot 1 is configured as a small vertically articulated six-axis robot assembler. Specifically, the multijoint robot 1 includes a base 2, shoulder 3, lower arm 4, upper arm 5, wrist 6, hand mounting body 7 and flange 8. The shoulder 3 is connected to the base 2 so as to be horizontally rotatable about a vertical axis J1. The lower arm 4 has a base portion which is connected to the shoulder 3 so that the lower arm 4 is vertically rotatable about an axis J2. The upper arm 5 is connected to a tip end portion of the lower arm 4 so that the upper arm 5 is vertically rotatable about an axis J3.

The upper arm 5 has a tip end portion to which a base portion of the wrist 6 is connected so that the wrist 6 is rotatable about art axis J4. The wrist 6 has a tip end portion to which the hand mounting body 7 is connected so that the hand mounting body 7 is rotatable about an axis J5. The flange 8 having a shape of a disc is connected to the hand mounting body 7 so that the flange 8 is rotatable about an axis J6. The flange 8 is provided with a bolt hole, not shown, so that a hand or other various tools can be detachably attached to the flange 8.

The shoulder 3, lower arm 4, upper arm 5, wrist 6, hand mounting body 7 and flange 8 are mutually connected via respective joint devices. Meanwhile, servomotors and speed reducers are provided for the respective joint devices. In response to the actuation of the servomotors, the respective joint devices are adapted to be actuated for the rotation of the shoulder 3, lower arm 4, upper arm 5, wrist 6, hand mounting body 7 and flange 8 about the respective axes J1 to J6. A robot controller, not shown, is connected to the robot 1. Under the control of the robot controller, various motions are ensured to be performed.

Figure 5:
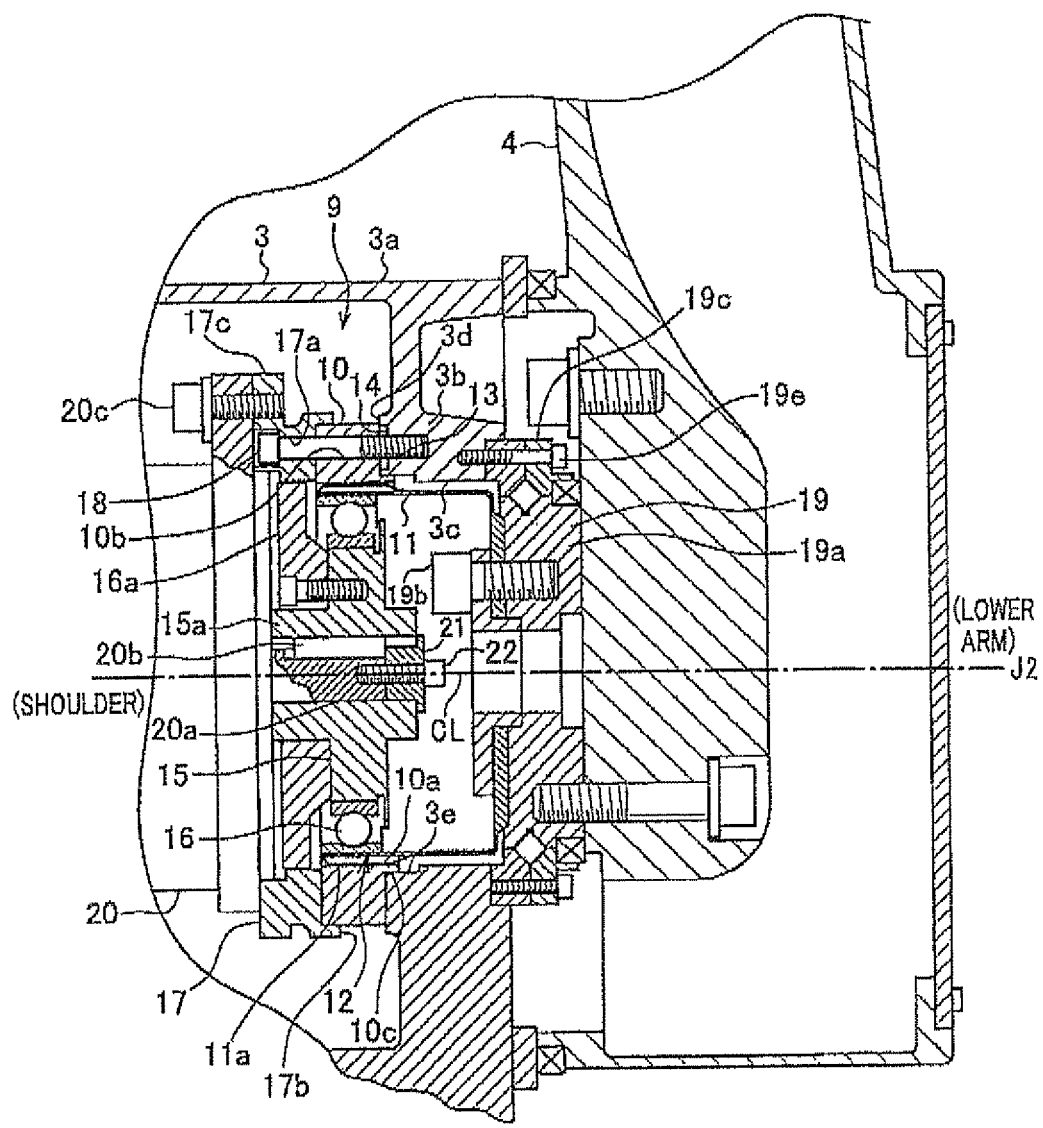
FIG. 5 is a schematic view illustrating a joint device including a harmonic speed reducer according to the first embodiment, the schematic view corresponding to a cross-sectional view taken along a line Z-Z of FIG. 4.

FIG. 5 is a cross-sectional view illustrating a structure of a joint device connecting the shoulder 3 and the lower arm 4 and including a harmonic speed reducer 9 for robots (hereinafter just referred to as "harmonic speed reducer 9"). As shown in FIG. 5, the shoulder 3 has a housing 3a in which a frame 3b is formed. The frame 3b configures a part of the harmonic speed reducer 9.

Figure 6:
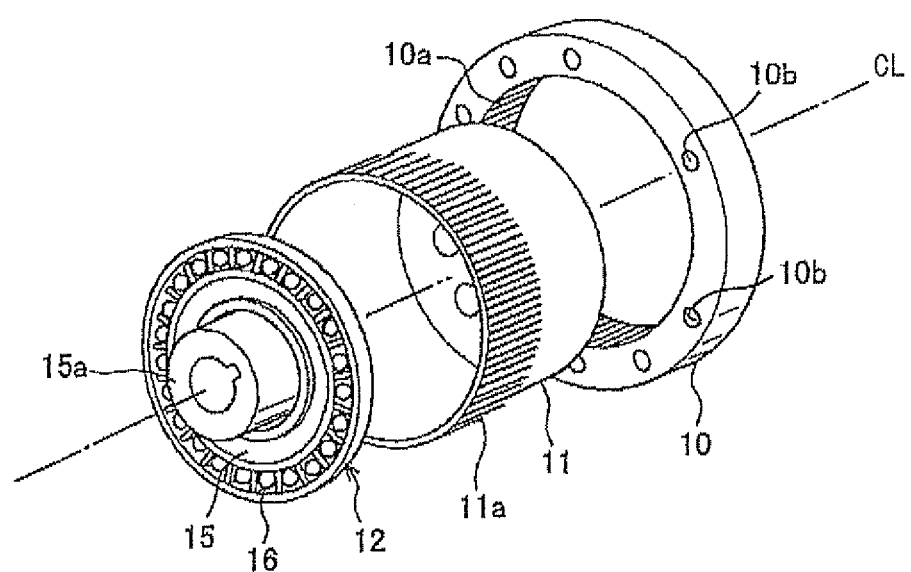
FIG. 6 is an exploded perspective view illustrating main components of the harmonic speed reducer.

Besides the frame 3b, the harmonic speed reducer 9 includes, as main components, a circular spline 10, a flexspline 11 and a wave generator 12, which are also shown in FIG. 6.

The frame 3b has a through hole 3c with its both ends being open. One open end of the through hole 3c has a peripheral edge portion which is provided with a circular spline mounting seat 3d (hereinafter also just referred to as "mounting seat 3d"). The mounting seat 3d has a flat surface extending in a direction perpendicular to a center axis line CL (that is the axis J2) of the harmonic speed reducer 9. The center axis line CL is an extension of a center line of an inner race 19a, i.e. an output shaft described later, of a cross roller bearing 19.

The circular spline mounting seat 3d is formed by machining so as to have a flat surface.

The mounting seat 3d has a plurality of internal threads 13, one of which is also shown in FIG. 7C, each of the internal threads 13 is tapped from the mounting seat 3d to the inside of the frame 3b so as to be parallel to the center axis line CL. As shown in FIGS. 7B to 7C, in the mounting seat 3d, a recess 14 is formed in a peripheral edge portion of the opening of each internal thread 13. The diameter of the recess 14 is larger than that of the internal thread 13. FIG. 8 shows a procedure of processing the recess 14 and the internal thread 13. As will be understood from FIG. 8, the circular spline mounting seat 3d is formed in a coarse cast member that constitutes the housing 3a of the shoulder 3 (step e1; refer to FIG. 7A). Then, a pilot hole PH for the internal thread 13 and the recess 14 are formed using a step drill (step c2; refer to FIG. 7B). Then, the pilot hole PH is tapped to provide the internal thread 13 therearound (step c3; refer to FIG. 7C). In this case, use of an existing so step drill having a counterbare diameter equal to the diameter of the recess 14 will enable simultaneous formation of the recess 14 and the pilot hole.

Figure 9:
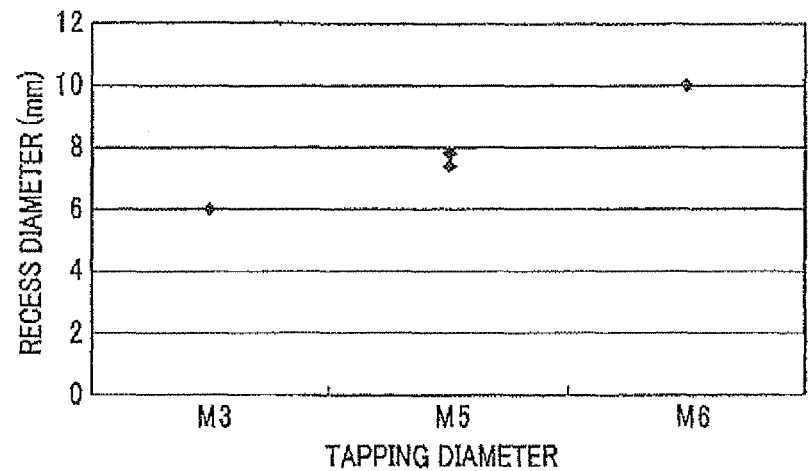
FIG. 9 is a graph illustrating a relationship between tapping diameter and the diameter of the recess.

The diameter of the recess 14 depends on the size of a tapping diameter (nominal diameter). Preferable diameters of the recess 14 have been found as shown in FIG. 9. Specifically, when the tapping diameter is 3 mm (nominal diameter M3), the diameter of each recess 14 may preferably be 6 mm. When the tapping diameter is 5 mm (nominal diameter M5), the diameter of each recess 14 may preferably be 8 mm. When the tapping diameter is 6 mm (nominal diameter M6), the diameter of each recess 14 may preferably be 10 mm. Thus, it has been found that as the tapping diameter becomes larger, the size of the recess 14 may preferably be made larger, and that as the tapping diameter becomes larger, the difference between the tapping diameter and the diameter of the recess 14 may also be preferably made larger.

The through hole 3c formed in the frame 3b has an inner edge portion on the side of the mounting seat 3d, which inner edge portion is formed with a circular spline positioning surface 3e (hereinafter also just referred to as "positioning surface 3e") with a slightly larger diameter than the through hole 3c.

Figure 3:
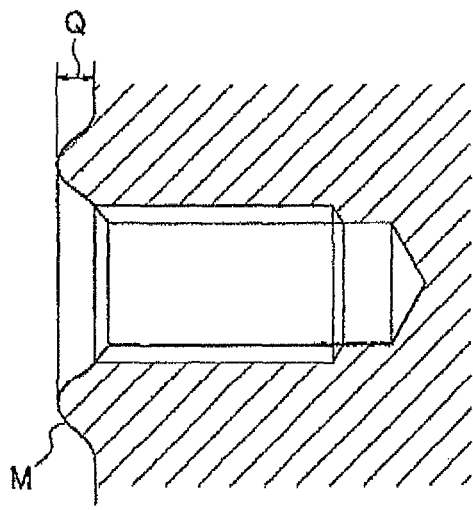
FIG. 3 is a cross-sectional view illustrating an internal thread to indicate tapping uplift.

Since the level of tapping uplift M (refer to FIG. 3) is of the order 1/100 mm, the depth of the recess 14 may be sufficient if the depth is 0.1 mm at most. In general, the recess 14 should have a depth larger than a height of the tapping uplift M produced when the internal thread is tapped.

Figure 1:
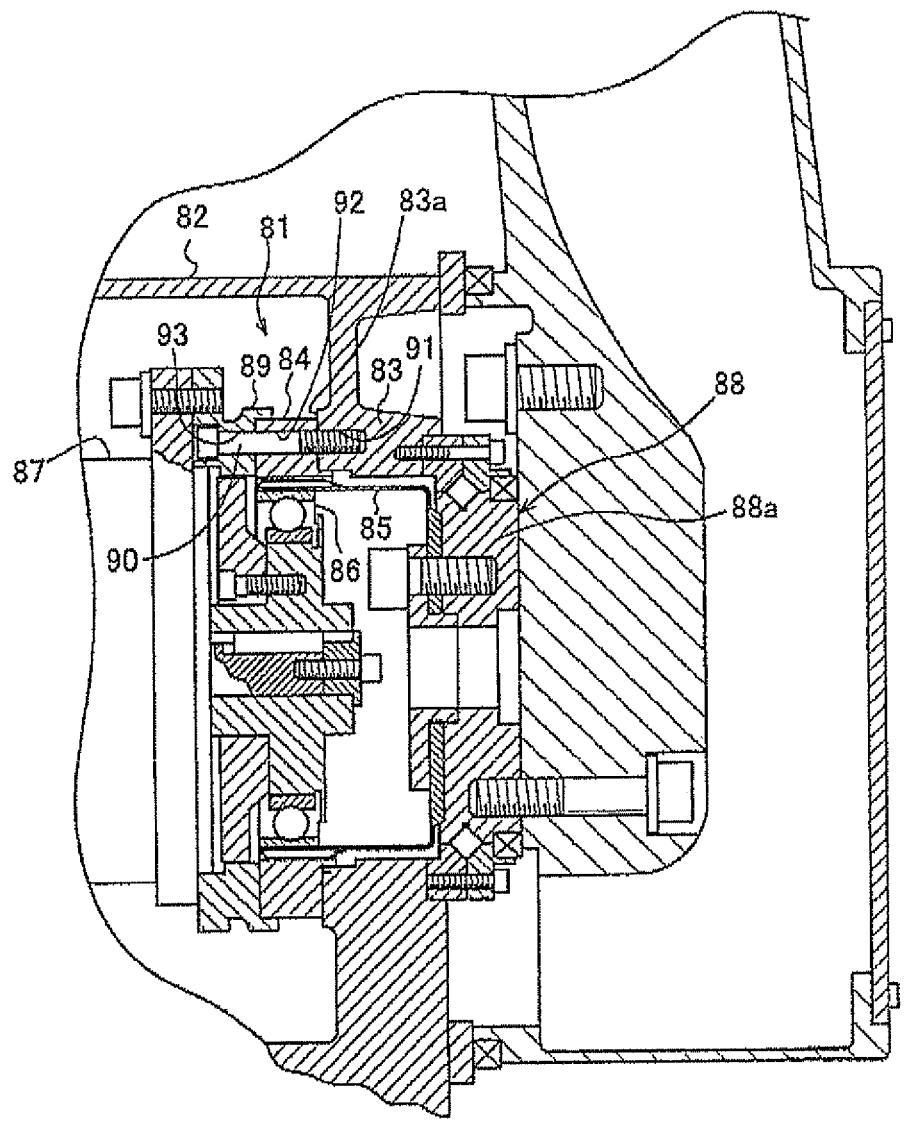
FIG. 1 is a schematic diagram illustrating a joint device including a harmonic speed reducer according to the conventional art.
Figure 2:
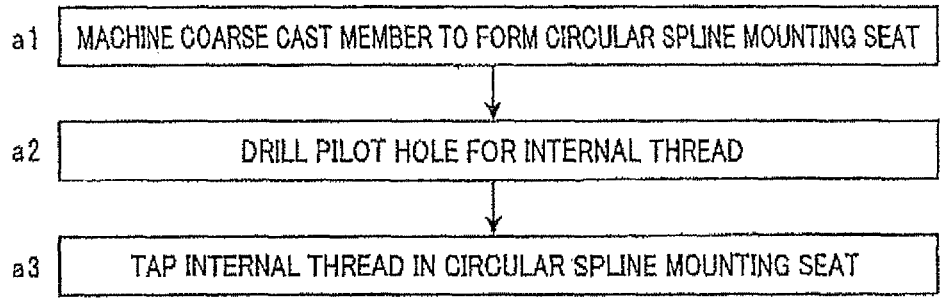
FIG. 2 is a time diagram illustrating a procedure of forming an internal thread according to the conventional art.

As shown in FIG. 6, the circular spline 10 has an annular shape with inner teeth 10a being formed in the inner periphery thereof. In the circular spline 10, as shown in FIG. 1, a plurality of screw insertion holes 10b are formed at positions corresponding to the respective internal threads 13. Each of the screw insertion holes 10b extends parallel to the center axis line CL from one end face to the other end face of the circular spline 10. Also, the circular spline 10 is formed with an annular projection 10c. The annular projection 10c is formed parallel to the center axis line CL, in an inner peripheral edge portion of an end face of the circular spline 10 (right-side end face in FIG. 5), which end face is in contact with the mounting seat 3d.

As shown in FIG. 6, the flexspline 11, which is made of elastic metal, has a bottomed cylindrical shape, or a thin cupped shape. The flexspline 11 has an open outer periphery in which a predetermined number of outer teeth 11a are formed. The number of the outer teeth 11a is fewer by two than the inner teeth 10a of the circular spline 10.

The wave generator 12 is configured by an elliptical cam 15 and a ball bearing 16. The ball bearing 16 is mounted on the outer periphery of the cam 15 in an elastically deformable manner to constitute the wave generator 12. The ball bearing 16 has an inner race which is fixed to the cam 15 and has an outer race which is elastically deformable in response to the rotation of the cam 15. The cam 15 of the wave generator 12 has a center portion in which a shaft boss 15a is formed. As shown in FIG. 5, a ball bearing cover 16a is screwed onto the cam 15.

A circular spline holder 17 (hereinafter also just referred to as "holder 17") having a plurality of screw insertion holes 17a is provided to hold the circular spline 10. The holder 17 also has an annular projection 17b that determines a position in the rightward direction as viewed in FIG. 5, and a screw seat 17c that forms a part of the outer periphery of the holder 17 and overhangs the left end side, in FIG. 5, of the holder 17.

The position of the circular spline 10 is coaxially determined by fitting the annular projection 10c to the positioning surface 3e of the mounting seat 3d of the frame 3b. The left end face, as viewed in FIG. 5, of the circular spline 10 is held by the circular spline holder 17. In this state, circular spline mounting screws 18 (hereinafter also just referred to as "mounting screws 18") are passed through the respective screw insertion holes 17a of the holder 17, the respective screw so insertion holes 10b of the circular spline 10 and the respective recesses 14. Thus, the mounting screws 18 are threaded into the respective internal threads 13 of the frame 3b and thus the circular spline 10 is mounted on the mounting seat 3d of the frame 3b.

The flexspline 11 is disposed in (inserted into) the circular spline 10 with the outer teeth 11a of the flexspline 11 being in engagement with the inner teeth 10a of the circular spline 10. The bottom portion of the flexspline 11 is connected to the inner race (corresponding to an output shaft) 19a of the cross roller bearing 19 via a screw 19b. The cross roller bearing 19 has an outer race 19c which is connected, via screws 19e, to the frame 3b on the side opposite to the side where the mounting seat 3d is provided. The base portion of the lower arm 4 is connected to the outer race 19c of the cross roller bearing 19.

The wave generator 12 is fitted to (inserted into) the flexspline 11 along the inner periphery on the other side of the outer teeth 11a. The shaft boss 15a of the cam 15 is connected to a rotary shaft 20a, i.e. an input shaft, of a servomotor 20 with the aid of a key 20b so as to enable is integral rotation of the wave generator 12 and the servomotor 20. The shaft boss 15a is retained by an end holder 21 and a screw 22. The servomotor 20 is attached to the screw seat 17c of the circular spline holder 17 by a screw 20c.

In the harmonic speed reducer 9 configured in this way, the flexspline 11 and the circular spline 10 are in engagement with each other only at two symmetrical positions which are angled apart from each other by 180 degrees. Upon rotation of the wave generator 12, the engagement positions between the flexspline 11 and the circular spline 10 are shifted. In this case, since the number of the outer teeth 11a of the flexspline 11 is fewer by two than the inner teeth 10a of the circular spline 10, the flexspline 11 rotates in the direction opposite to the rotational direction of the wave generator 12 by an angle corresponding to two teeth, which corresponds to the difference in number between the outer and inner teeth 11a and 10a. This rotation as an output is transmitted to the lower arm 4.

Figure 10:
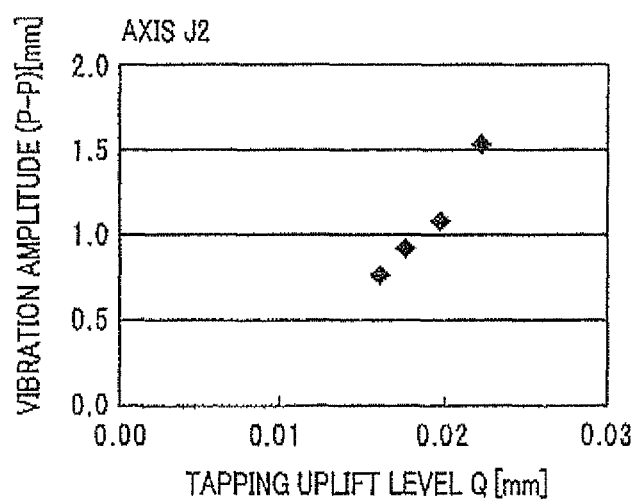
FIG. 10 is a graph illustrating a relationship between tapping uplift level associated with an axis J2 and vibration amplitude.
Figures 11, 12:
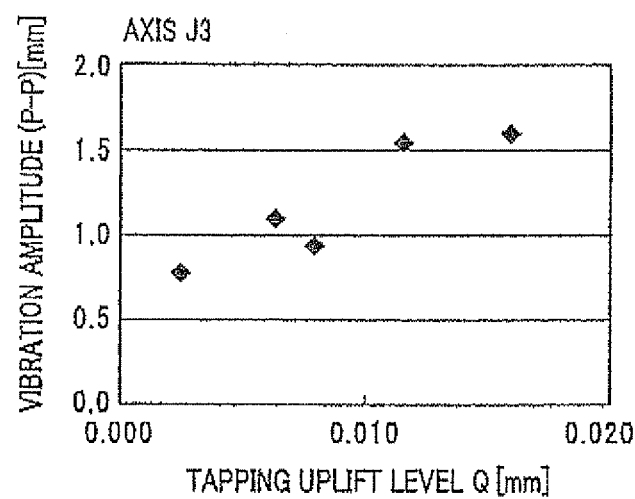
FIG. 11 is a graph illustrating a relationship between tapping uplift level associated with an axis J3 and vibration amplitude.
FIG. 12 is a table indicating roughness difference in the surface of a circular spline mounting seat subjected to scraping, in the surface of a circular spline mounting seat of the conventional art, and in the surface of a circular spline mounting seat in which recesses are formed by machining.

The following are the results of studies made by the inventors of the present invention. FIG. 10 is a graph showing the results of the study on a harmonic speed reducer used at the joint (at axis J2) between the shoulder and the lower arm of a robot. The graph shows a relationship between tapping uplift level Q and vibration amplitude (the vibration amplitude at the hand mounting body of the robot) in the case where such tapping uplift M is caused (as in the conventional art) in a circular spline mounting seat (refer to FIG. 3). FIG. 11 is a graph also showing the results of the study on a harmonic speed reducer used at the joint (at axis J3) between the lower arm and the upper arm of the robot. The graph shows a relationship between tapping uplift level Q and vibration amplitude (the vibration amplitude at the hand mounting body of the robot) in the case where such tapping uplift M s caused (as in the conventional art) in a circular spline mounting seat. As can be seen from these graphs, it has been revealed that as the tapping uplift level becomes higher, the vibration amplitude becomes larger, whether a speed reducer is positioned at the axis J2 or J3.

FIG. 12 is a table indicating the results of the study on the flatness (roughness difference [mm]) in the surface of a circular spline mounting seat. In the table, cells *1 and *2 indicate the flatness (roughness difference [mm]) in the surface of a circular spline mounting seat having no recesses and not subjected to scraping as in the conventional art. The upper cell *1 indicates the flatness in the surface of a circular spline mounting seat in a harmonic speed reducer used at the joint (at axis J2) between the shoulder and the lower arm. The lower cell *2 indicates the flatness in the surface of a circular spline mounting seat in a harmonic speed reducer used at the joint (at axis J3) between the lower arm and the upper arm.

Further, cells *3 and 4* indicate the flatness in the case where a circular spline mounting seat has been scraped. Cells *5 and *6 indicate the flatness in the case where a circular spline mounting seat so has been recessed but has not been scraped.

From the comparison between the cells *1 and *2 indicating the flatness in the conventional art and the cells *3 and *4 indicating the flatness resulting from scraping, it will be understood that the flatness resulting from scraping is high. Regarding the flatness resulting from forming recesses as indicated in the cells *5 and *6, it will be understood that the flatness of the entire seat is higher than the case of scraping, owing to the removal of the tapping uplift M by the formation of the recesses. Review of the table may lead to the conclusion that the surface of the circular spline mounting seat was rough, in the conventional art, around each internal thread.

Figure 13:
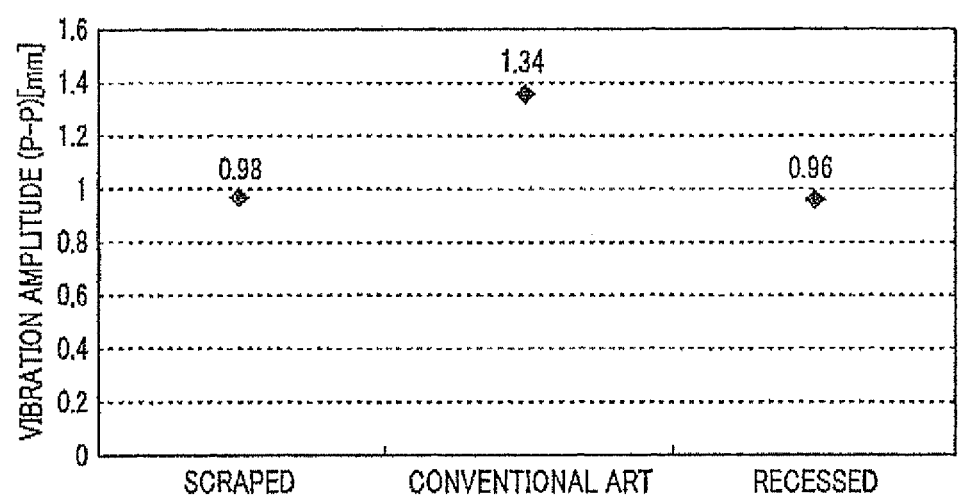
FIG. 13 is a graph illustrating vibration amplitude of a speed reducer subjected to scraping, of a speed reducer of the conventional art, and of a speed reducer with recesses formed by machining.
Figure 15:
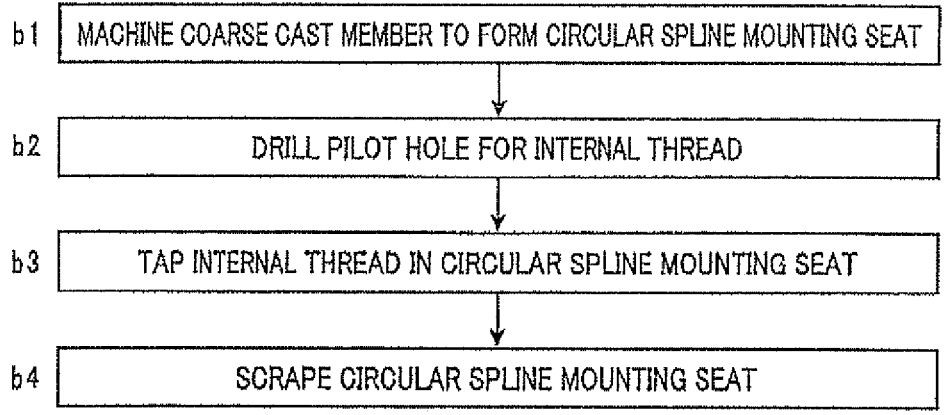
FIG. 15 is, a time diagram illustrating a procedure of forming an internal thread and of performing scraping.

FIG. 13 is a graph showing the results of the study on the vibration amplitude in the case where a circular spline mounting seat: has not been recessed and has not been scraped as in the conventional art; has been scraped; and has been recessed but has not been scraped.

As can be seen from the graph, the seat of the conventional art resulted in large vibration amplitude of 1.34 mm. By performing is scraping, the vibration amplitude has been reduced to 0.98 mm. By forming the recesses 14 of the present embodiment, the vibration amplitude has been reduced to 0.96 mm which is smaller than the case of performing scraping. Review of this graph may also lead to the conclusion that the surface of the circular spline mounting seat, in the conventional, art was rough around each internal thread.

Therefore, the surface of a circular spline mounting seat does not have to be entirely subjected to scraping for the improvement of flatness. Instead, only the formation of a recess around each internal thread can achieve the effect of mitigating vibration, which effect is of the same level as will be exerted by performing scraping.

It will be understood from the graph of FIG. 13 that: the vibration amplitude is large in the conventional configuration; the vibration amplitude is reduced by performing scraping; and the vibration amplitude is reduced more by only forming the recesses, than by so performing scraping that incurs high manufacturing cost.

This reduction in the vibration amplitude is derived from the inventor's study described before with reference to FIGS. 14A-14D and 15.

According to the harmonic speed reducer 9 of the present embodiment, the recess 14 is formed in the peripheral edge portion around the opening of each of the internal threads 13 which are formed in the circular spline mounting seat 3d of the frame 3b, the recess 14 having a diameter larger than that of the internal thread 13. Therefore, so-called tapping uplift NI can be eliminated from the peripheral edge portion around the opening of each of the internal threads 13. Under these conditions, the circular spline mounting screws 18 are passed through the respective screw insertion holes 17a of the circular spline holder 17, the respective screw insertion holes 10b of the circular spline 10 and the respective recesses 14, and threaded into the respective internal threads 13 of the frame 3b, for fixation of the circular spline 10 onto the frame 3b. In this case, since there is no tapping uplift around each of the internal threads 13, the circular spline 10 can be fixed to the frame 3b without deforming the circular spline 10 in the axial direction. In this way, with only the simple configuration of forming the recesses 14, the harmonic speed reducer 9 can mitigate vibration to thereby enhance the repeat accuracy of the robot. In addition, the simple configuration is suitable for mass production.

Second Embodiment

Figure 16:
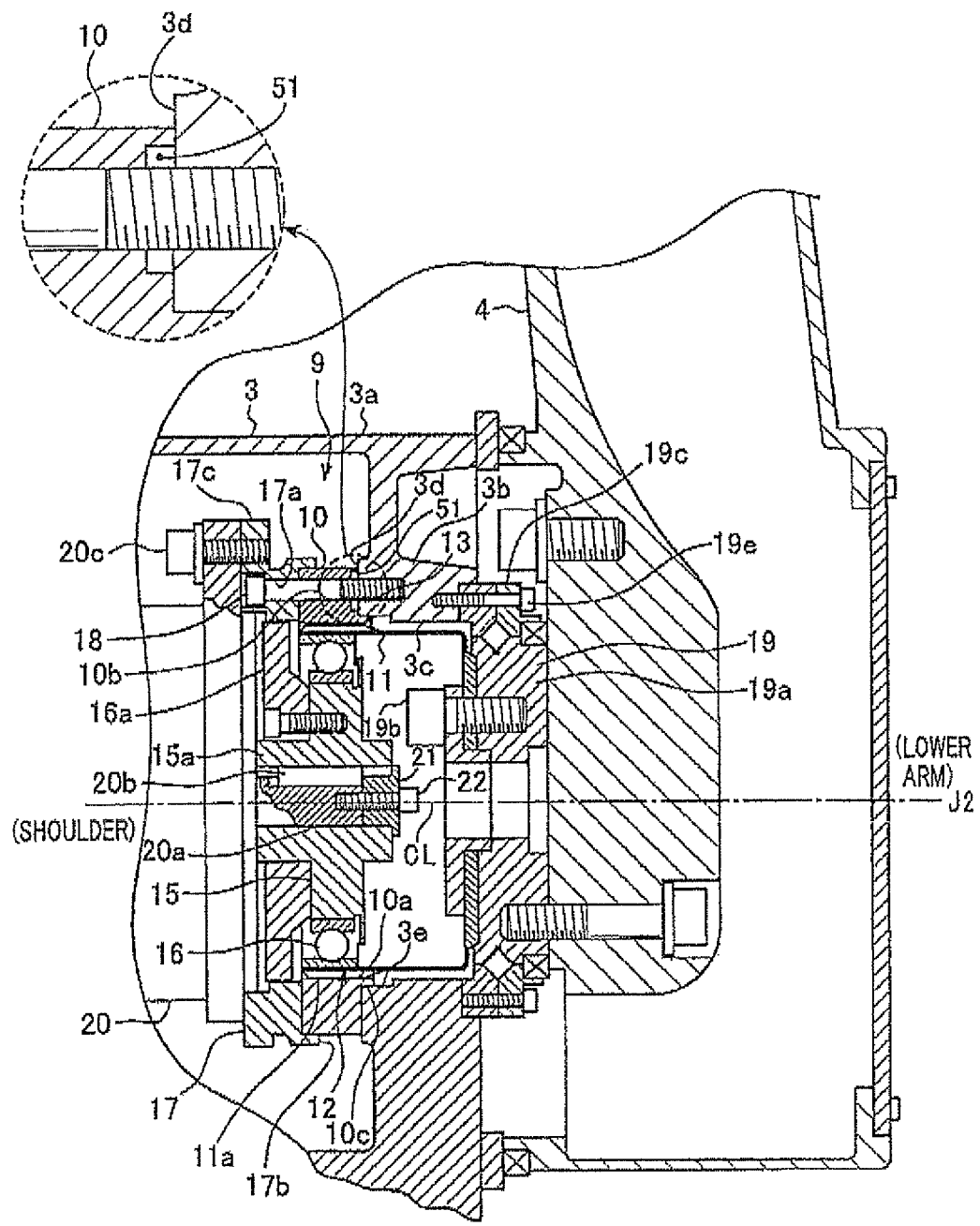
FIG. 16 is a schematic diagram illustrating a joint device including a harmonic speed reducer according to a second embodiment of the present invention.

Referring to FIG. 16, a second embodiment of the present invention is described. In the second, the components identical with or similar to those in the first embodiment are given the same reference numerals for the sake of omitting explanation.

FIG. 16 is a schematic diagram illustrating a joint device including the harmonic speed reducer 9 according to the second embodiment. In the second embodiment, a recess 51 is formed not in the circular spline mounting seat 3d but around each of the screw insertion holes 10b of the circular spline 10. In this case, the recess 51 is formed so as to be coaxial with the opening of the corresponding internal thread 13.

According to the second embodiment, a tapping uplift, if it is present in the peripheral edge portion of the opening of the internal thread 13 of the frame 3b, can be accommodated in the corresponding recess 51 of the circular spline 10 when the circular spline 10 is fixed onto the frame 3b. As a result, in the second embodiment as well, the circular spline 10 can be mounted on the frame 3b without being deformed in the axial direction. In this way, with only the simple configuration of forming the recesses 51, the harmonic speed reducer 9 can mitigate vibration to thereby enhance the repeat accuracy of the robot. In addition, the simple configuration is suitable for mass production.

The present invention is not intended to be limited to the embodiments described above but may be appropriately modified in the dimensions of the diameter and the depth of the recesses, according to the material of the robot housing, the size of the harmonic speed reducer, or other factors.

What is claimed is:

1. A harmonic speed reducer for a robot having a housing, comprising;
    a frame formed in the housing;
    an annular circular spline fixed to the frame and having an inner periphery provided with inner teeth;
    a cylindrical flexspline inserted into the circular spline and having an outer periphery provided with outer teeth that are in engagement with the inner teeth, the flexspline being connected with an output shaft;
    an elliptical wave generator fitted into the flexspline and connected with an input shaft; and
    a circular spline mounting screw, wherein
        the frame has a through hole with its one open end having a peripheral edge portion provided with a circular spline mounting seat of which surface is planar in a direction perpendicular to a center axis line that is an extension of a center line of the output shaft of the harmonic speed reducer;
        the frame has an internal thread tapped parallel to the center axis line, the internal thread extending from the circular spline mounting seat to the inside of the frame, the internal thread in the circular spline mounting seat having a peripheral edge portion at an opening for the internal thread, the peripheral edge portion being formed with a recess having a diameter larger than a diameter of the internal thread;

the circular spline having: (1) a substantially uniform thickness between the frame and a head of the circular spline mounting screw, and (2) a screw insertion hole at a position corresponding to the internal thread, the screw insertion hole being formed from one end face to the other end face of the circular spline so as to be parallel to the center axis line;

the circular spline mounting screw is passed through the screw insertion hole of the circular spline and the recess, and threaded into the internal thread, for fixation of the circular spline onto the frame; and the recess has a depth larger than a height of a tapping uplift produced when the internal thread is tapped.

* * * * *